US010179622B2

(12) United States Patent
Hermansen et al.

(10) Patent No.: US 10,179,622 B2
(45) Date of Patent: Jan. 15, 2019

(54) SEAT POST

(71) Applicant: SELLE ROYAL S.P.A., Pozzoleone (Vicenza) (IT)

(72) Inventors: Frank Hermansen, Laguna Beach, CA (US); Carl Winefordner, Laguna Beach, CA (US); Mark Rane, Laguna Beach, CA (US)

(73) Assignee: SELLE ROYAL S.P.A., Pozzoleone (Vicenza) (IT)

( * ) Notice: Subject to any disclaimer, the term of this patent is extended or adjusted under 35 U.S.C. 154(b) by 20 days.

(21) Appl. No.: 15/541,840

(22) PCT Filed: Jan. 13, 2016

(86) PCT No.: PCT/IB2016/050142
§ 371 (c)(1),
(2) Date: Jul. 6, 2017

(87) PCT Pub. No.: WO2016/113682
PCT Pub. Date: Jul. 21, 2016

(65) Prior Publication Data
US 2018/0015976 A1    Jan. 18, 2018

(30) Foreign Application Priority Data
Jan. 13, 2015 (IT) .............................. VR2015A0005

(51) Int. Cl.
*B62J 1/00* (2006.01)
*B62J 1/08* (2006.01)

(52) U.S. Cl.
CPC ..................... *B62J 1/08* (2013.01)

(58) Field of Classification Search
CPC ............. B62J 1/00; B62K 19/36; B62K 19/18
See application file for complete search history.

(56) References Cited

U.S. PATENT DOCUMENTS

| 3,992,054 A | 11/1976 | Campagnolo |
| 4,155,590 A | 5/1979 | Cunningham |
| 4,502,811 A | 3/1985 | Patriarca |
| 4,783,119 A | 11/1988 | Moses |
| 5,190,346 A | 3/1993 | Ringle |
| 5,383,706 A | 1/1995 | Chen |

(Continued)

FOREIGN PATENT DOCUMENTS

| DE | 20005829 | 12/2000 |
| FR | 1146981 | 11/1957 |

*Primary Examiner* — Shin H Kim
(74) *Attorney, Agent, or Firm* — Tutunjian & Bitetto, P.C.

(57) ABSTRACT

A seat post having a quill head with a top surface, a lower cradle rotatable with respect to the top surface about an axis (X), and an upper cradle, reciprocally coupled for clamping the saddle rails (R) of a bicycle. The seat post includes front and rear fasteners connecting the upper cradle to the quill head, and front and rear pivots in which the front and rear fastener are respectively engaged in order to adjust the rails (R) angle with respect to the quill head. The quill head includes front and rear seats in which the pivots are respectively rotationally engaged, the axes (Y,Z) of the pivots being displaced substantially at a same distance (D) from the axis (X), regardless of rails (R) angle adjustment; the top surface has a convex shape, the lower cradle includes a lower concave seat suitable to engage the top surface.

13 Claims, 4 Drawing Sheets

(56) References Cited

U.S. PATENT DOCUMENTS

| | | | |
|---|---|---|---|
| 5,466,042 A | 11/1995 | Herman | |
| 5,501,506 A | 3/1996 | Kao | |
| 5,649,738 A | 7/1997 | Thomson et al. | |
| 5,664,829 A | 9/1997 | Thomson et al. | |
| 6,702,376 B1* | 3/2004 | Shen | B62J 1/00 248/371 |
| 7,083,180 B2 | 8/2006 | Turner | |
| 9,371,102 B1* | 6/2016 | Botkin | B62J 1/18 |
| 9,937,971 B2* | 4/2018 | McPherson | B62J 1/10 |
| 2003/0227198 A1* | 12/2003 | Menayan | B62J 1/08 297/215.14 |
| 2005/0225132 A1* | 10/2005 | Tisue | B62J 1/08 297/195.1 |
| 2010/0187870 A1* | 7/2010 | Mackenroth | B62J 1/04 297/209 |
| 2013/0113242 A1* | 5/2013 | Connors | B62J 1/08 297/215.13 |
| 2016/0001835 A1* | 1/2016 | Wodjewodzki | B62J 1/02 297/215.15 |
| 2016/0075389 A1* | 3/2016 | Ahnert | B62J 1/065 297/311 |
| 2016/0176463 A1* | 6/2016 | McPherson | B62J 1/10 297/215.15 |

* cited by examiner

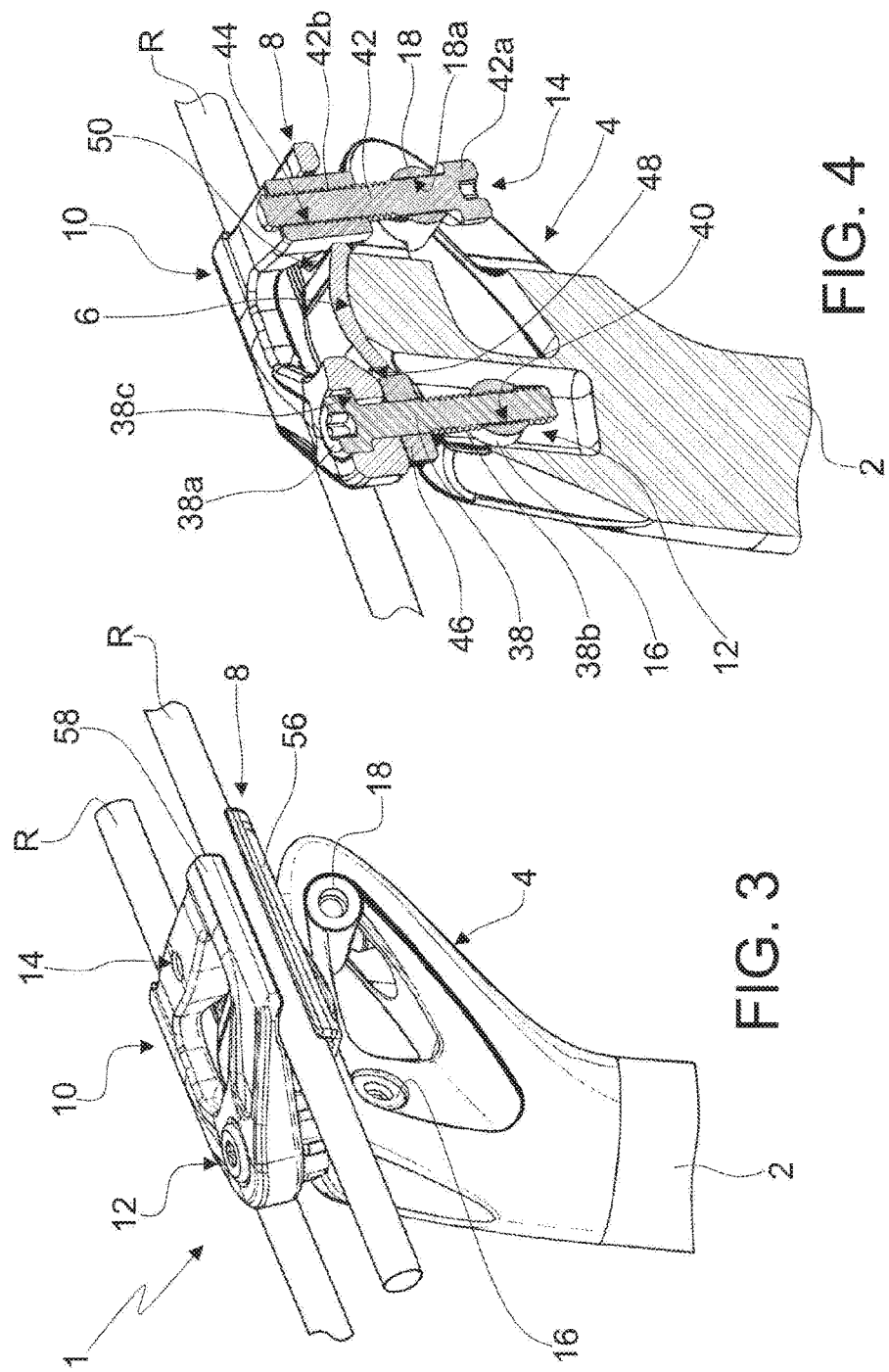

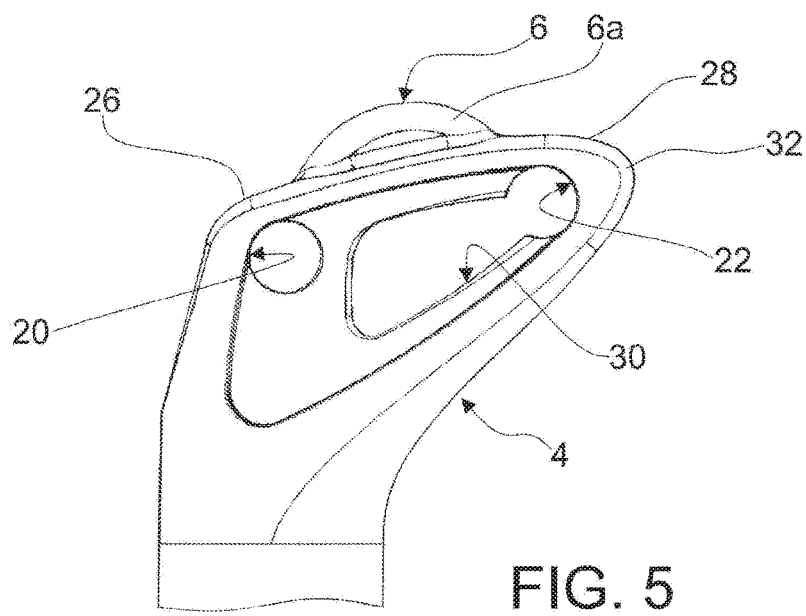
FIG. 5
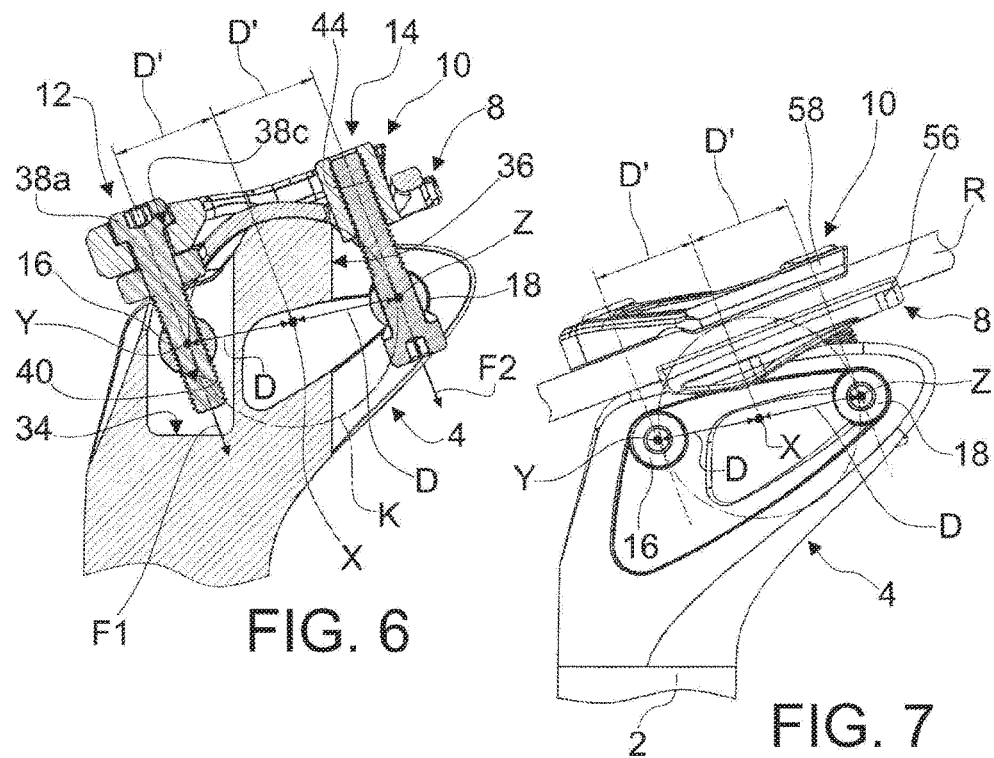
FIG. 6
FIG. 7

SEAT POST

TECHNICAL FIELD OF THE INVENTION

The present invention relates to a seat post.

More specifically, the present invention relates to a seat post for bicycles and the like.

STATE OF THE ART

Seat posts are known comprising an assembly that clamps the saddle rails in such a way that the rail angle is adjustable.

In general, there are solutions that secure the angle of the saddle rails by friction or by fasteners bolted in position.

Typically, in the friction solution the assembly comprises a quill head having a concave or convex surface on top, and a lower cradle and an upper cradle which clamp the saddle rails: the angle adjustment is achieved by rotating the lower cradle on the top surface of the quill head.

This solution is shown, for example, in U.S. Pat. Nos. 3,992,054, 4,155,590, 4,502,811, 5,190,346, 7,083,180.

One of the main drawbacks of the friction solution is that it is difficult to prevent angle movement with friction alone, therefore some solutions include further serrations.

On the other hand, adding serrations prevents extremely fine angle adjustment.

Generally, a friction solution alone requires extremely high fastener torque which is difficult to achieve with portable hand tools: when the components are jammed together, future adjustments become even harder.

The solutions comprising fasteners bolted in position do not depend on friction for securing the saddle rail angle.

Instead, the saddle rail angle is directly held in place by front and rear bolt tension.

Typically, the saddle rails are clamped between a lower cradle and an upper cradle which rotates on a concave or convex surface on the top of the quill head.

This system is superior for fine tuning the exact rail angle desired and without any slipping, and the orientation of clamping fits a wide variety of rail shapes.

The angle of the rails cannot change, unless either the fasteners are unscrew or fail.

This solution is shown, for example, in U.S. Pat. Nos. 4,783,119, 5,383,706, 5,466,042, 5,501,506, 5,649,738, 5,664,829.

The main drawback of this solution is that the load applied to the front and rear fasteners changes with the angle of the rails, making it impossible to properly size or torque the fasteners for all rail angles.

This makes it much more likely for the seat post head to inadvertently come loose during long term use, in other words the fasteners tend to loosen over time unless regularly tightened because of the unequal forces on the front and rear fasteners, especially depending on the rail angle.

For a better understanding, FIGS. 1,2 schematically show a seat post with fasteners bolted in position according to the prior art, in particular as described in U.S. Pat. Nos. 5,466,042, 5,649,738, 5,501,506, 5,664,829.

In particular, FIG. 1 shows a seat post with fasteners bolted in position, wherein saddle rails angle is adjusted downward, while FIG. 2 shows a seat post with fastening bolt means wherein saddle rails angle is adjusted upward.

According to such prior art solution, the seat post assembly A comprises a quill head H having a concave surface S on top, a lower cradle LC engaged in the concave surface C and an upper cradle UC clamping the saddle rails R together with the lower cradle LC.

Front and rear fasteners B1,B2 are screwed in respective front and rear pivots P1,P2 engaged in the upper cradle UC, in order to tightly fasten the upper cradle UC to the lower cradle LC.

In the position shown in FIG. 1, the first distance D1 between the axis of the front fastener B1 and the rotation center C of the lower cradle UC is greater than the second distance D2 between the axis of the rear fastener B2 and the rotation center C.

Therefore, the first load F1 applied on front fastener B1 is smaller than the second load F2 applied on rear fastener B2 (in the shown position, F1=73,5% of F2).

On the other hand, in the position shown in FIG. 2, the first distance D1 between the axis of the front fastener B1 and the rotation center C of the lower cradle UC is smaller than the second distance D2 between the axis of the rear fastener B2 and the rotation center C.

Therefore, the first load F1 applied on front fastener B1 is greater than the second load F2 applied on rear fastener B2 (in the shown position, F1=113% of F2).

Documents FR1146981 and DE20005829 both describe a seat post, suitable for clamping the rails of the saddle of a bicycle in the desired position, comprising a head having an upper surface, a lower cradle and an upper cradle coupled with one another for clamping the rails of the saddle; the seat post further includes front and rear fasteners connecting the upper cradle to the head.

SUMMARY OF THE INVENTION

The technical aim of the present invention is therefore to improve the state of the art.

Within such technical aim, it is an object of the invention to develop a seat post of the kind having fasteners bolted in position in which the drawbacks due to the different load applied to the fasteners are avoided, regardless of the adjustment angle of the saddle rails.

Another object of the invention is to devise a seat post of the kind having fasteners bolted in position in which fastening operations are made easier, regardless of the adjustment angle of the saddle rails.

This aim and these objects are all achieved by the seat post according to the present application.

The seat post, of the kind suitable to clamp the rails of the saddle of a bicycle, or the like, in the desired position, comprises a quill having a quill head, said quill head comprising a top surface, a lower cradle and an upper cradle reciprocally coupled in order to clamp the rails of the saddle; the lower cradle is rotationally associated to the top surface of the quill head around a rotational axis.

The seat post further comprises a front fastener and a rear fastener, connecting the upper cradle to quill head, and a front pivot and a rear pivot in which the front fastener and the rear fastener are respectively engaged in order to adjust the saddle rails angle with respect to the quill head.

The quill head comprises a front seat and a rear seat in which the front pivot and the rear pivot are respectively rotationally engaged, the front and rear axes of said front and rear pivot being displaced substantially at a same distance from the rotational axis, regardless of rails angle adjustment.

According to one aspect of the invention, the top surface of the head has a convex shape; the lower cradle comprises a lower concave seat suitable to engage the top surface.

The present application refers to preferred and advantageous embodiments of the invention.

BRIEF DESCRIPTION OF THE DRAWINGS

These and other advantages will be better understood by any man skilled in the art from the following description that follows and from the attached drawings, given as a non-limiting example, in which:

FIG. 3 is a perspective view of the seat post according to the present invention;

FIG. 4 is a perspective sectional view of the seat post according to the invention;

FIG. 5 is a side view of the quill head of the seat post;

FIG. 6 is a side sectional view of the seat post in a first position wherein the saddle rails angle is adjusted downward;

FIG. 7 is a side view of the seat post in the first position shown in FIG. 6;

DETAILED DESCRIPTION

Figure 1:
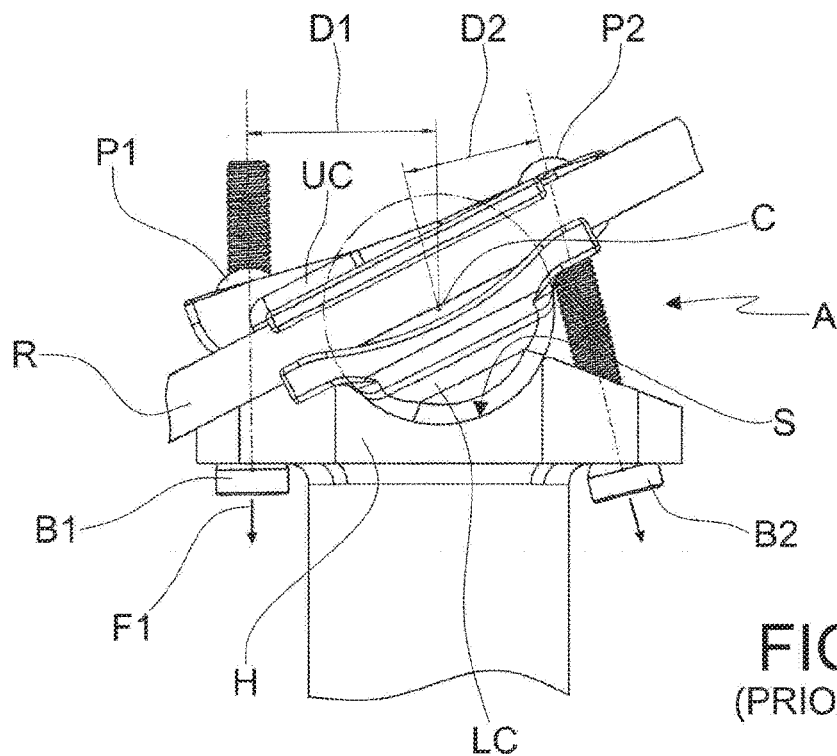
FIG. 1 is a side view of a seat post according to the prior art, wherein the saddle rails angle is adjusted downward.
Figure 2:
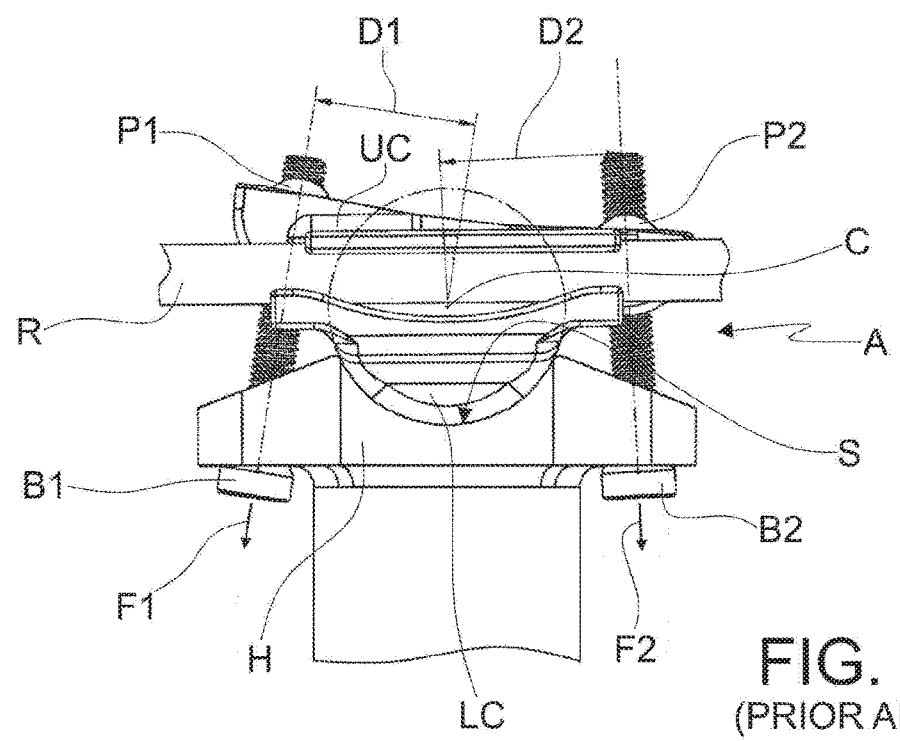
FIG. 2 is another side view of the seat post of FIG. 1, wherein the saddle rails angle is adjusted upward.

With reference to the schematic representation of FIG. 3, a seat post according to the invention is wholly indicated with 1.

In the embodiment disclosed hereafter individual characteristics, given in connection with such specific embodiment, may actually be interchanged with other different characteristics that exist in other embodiments.

The seat post 1 according to the invention is of the kind suitable to clamp the rails R of the saddle of a bicycle, or the like, in the desired position.

The saddle comprising the rails R can be of any kind, without any limitation.

The seat post 1 comprises a quill 2.

The quill 2 comprises a quill head 4; the quill head 4 comprises a top surface 6.

The seat post 1 further comprises a lower cradle 8 and an upper cradle 10.

The lower cradle 8 and the upper cradle 10 are, in use, reciprocally coupled in order to clamp the rails R of the saddle, as better disclosed hereafter.

The lower cradle 8 is rotationally associated to the top surface 6 of the quill head 4 around a rotational axis X, in order to adjust the rails R angle with respect to the quill head 4.

The seat post 1 further comprises a front fastener 12 and a rear fastener 14.

The front fastener 12 and the rear fastener 14 connect, in use, the upper cradle 10 to the quill head 4.

The seat post 1 further comprises a front pivot 16 and a rear pivot 18.

The front fastener 12 and the rear fastener 14 are respectively engaged in the front and rear pivots 16,18 in order to adjust the rails R angle with respect to the quill head 4, as better disclosed hereafter.

The front pivot 16 is rotatable around a front axis Y, while the rear pivot 18 is rotatable around a rear axis Z.

The front axis Y and the rear axis Z are parallel to the rotational axis X.

According to an aspect of the present invention, the quill head 4 comprises a front seat 20 for the front pivot 16, and a rear seat 22 for the rear pivot 18.

The front pivot 16 is rotationally engaged inside the front seat 20; the rear pivot 18 is rotationally engaged inside said rear seat 22.

The front seat 20 and the rear seat 22 are passing through the quill head 4.

In this way, the respective front and rear pivots 16,18 can be easily inserted into/extracted from the respective front and rear seats 20,22.

According to another aspect of the present invention, the front and rear axes Y,Z respectively of the front and rear pivot 16,18 are displaced substantially at a same distance D from the rotational axis X, regardless of rails R angle adjustment.

As it will be better explained hereafter, thanks to this feature the load on the front fastener 12 is always exactly the same as the load on the rear fastener 14, regardless of rails R angle adjustment.

Thanks to this, the fasteners 12,14 will stay tightened better.

Moreover, the rail R is very easy to adjust to any desired angle.

In addition, the seat post according to the invention is able to pass fatigue testing more easily.

In particular, FIGS. 6,7 refers to a first adjustment position in which the rails R angle is adjusted completely downward.

As it can be seen, according to the invention the first load F1 of the front fastener 12 is exactly the same as the second load F2 on the rear fastener 14.

Figure 8:
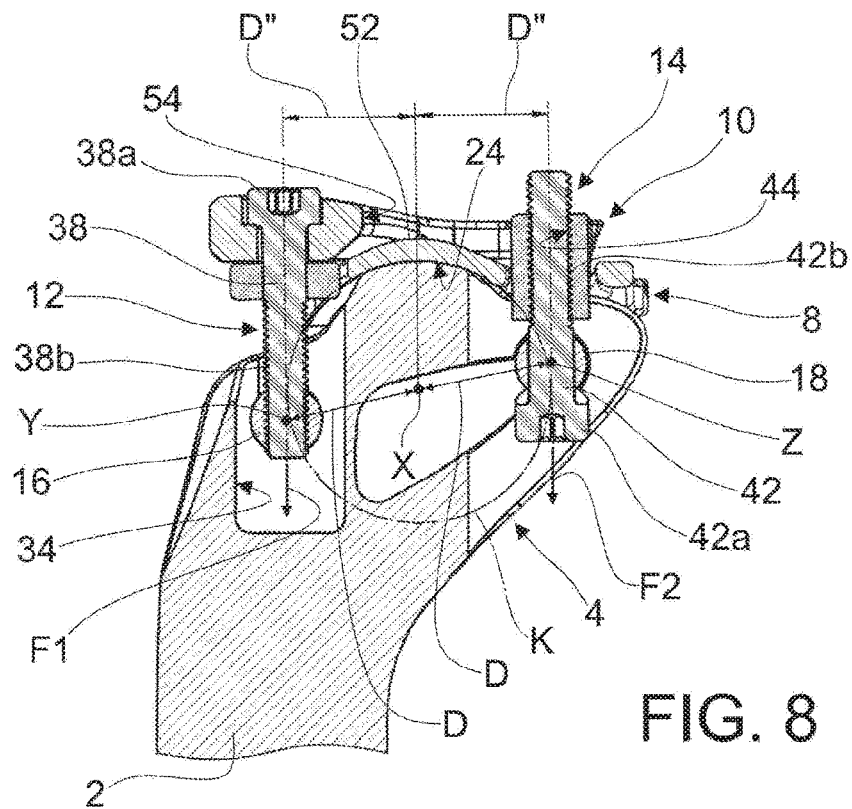
FIG. 8 is a is a side sectional view of the seat post in a second position wherein the saddle rails angle is adjusted upward.
Figure 9:
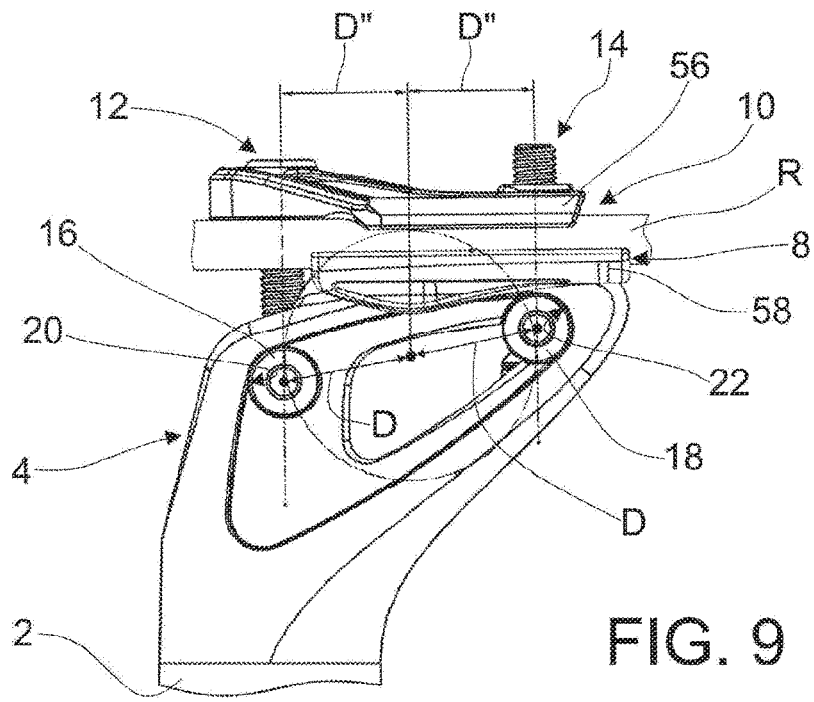
FIG. 9 is a side view of the seat post in the second position shown in FIG. 8.

FIGS. 8,9 refers to a second adjustment position in which the rails R angle is adjusted completely upward.

Also in this position, the first load F1 of the front fastener 12 is exactly the same as the second load F2 on the rear fastener 14; furthermore, the distance D between the front, rear axes Y,Z and the rotational axis X is exactly the same as the one measured in the adjustment position of FIGS. 6,7.

According to another aspect of the invention, the top surface 6 of the quill head 4 has a convex shape.

Correspondingly, the lower cradle 8 comprises a lower concave seat 24 suitable to engage the top surface 6.

More in detail, the top surface 6 comprises a cylindrical portion 6a which is coaxial to the rotational axis X.

In FIGS. 6,7,8,9 a circumference K in dotted and dashed line is shown which represents and illustrates the geometrical shape of the top surface 6 of the quill head 4.

Such circumference K has radius equal to distance D.

In FIGS. 6,7,8,9 is also shown the distances D',D" between the axes of the front, rear fasteners 12,14 and the rotational axis X, in the different rails R angle positions.

This means that, in use, a rotation of the lower cradle 8 around rotational axis X determines a corresponding rotation of the front pivot 16 and rear pivot 18 around their respective front axis Y and rear axis Z: this allows the front fastener 12 and the rear fastener 14 to correspondingly and rigidly rotate around rotational axis X without varying their respective distance D from the axis X itself.

Therefore, also the loads F1,F2 are constant regardless of the angle adjustment of the rails R.

The quill head 4 has a rearward elongated shape.

The quill head 4 comprises a front limit 26 and a rear limit 28 for the rotation of the lower cradle 8 around the rotational axis X.

The front limit 26 is foreseen in front of the top surface 6, while the rear limit is foreseen behind the top surface 6 itself.

The quill head 4 further comprises a central passing channel 30, possibly communicating with the front seat 20 and/or the rear seat 22.

The central passing channel 30 allows a great weight reduction of the quill head 4 without jeopardizing its functionality.

The rear end 32 of the quill head 4 is properly rounded in order to avoid sharp dangerous edges.

The quill 2 can be made of any suitable material, for example aluminum alloy, carbon fiber or the like.

The quill head 4 further comprises a front recess 34 and a rear recess 36 respectively intercepting the front seat 20 and the rear seat 22, in order to allow the positioning of the front fastener 12 and the rear fastener 14.

Front recess 34 and rear recess 36 can be of any suitable shape.

The front fastener 12 comprises a front screw 38 having a front screw head 38a resting on the upper cradle 10, and a front screw thread 38b engaged in a front nut 40 foreseen in the front pivot 16.

The front nut 40 is constituted by a passing threaded hole foreseen in the front pivot 16; such passing threaded hole has a respective axis which is perpendicular to the front axis Y.

The front screw head 38a rests, in use, inside a recessed seat 38c foreseen in the upper surface of the upper cradle 10.

The rear fastener 14 comprises a rear screw 42 passing through the rear pivot 18 and having a rear screw head 42a resting on the external surface of the rear pivot 18 itself, and a rear screw thread 42b engaged in a rear nut 44 foreseen in the upper cradle 10.

The rear pivot 18 comprises a passing hole 18a having axis which is perpendicular to rear axis Z.

The front fastener 12 comprises an adjustment ring 46 fastened to the shank of the front screw 38.

Correspondingly, the lower cradle 8 comprises a front opening 48 through which the adjustment ring 46 is passing.

The lower cradle 8 further comprises a rear opening 50 through which the rear nut 40 of the upper cradle 10 is passing.

In order to reduce the overall weight of the seat post 1, the lower cradle 10 has a low thickness, and therefore it comprises a convex top 52 corresponding to the lower concave seat 24.

Correspondingly, the upper cradle 10 comprises a central opening 54, or recess, housing the convex top 52 of the lower cradle 8; this also helps reducing the weight of the upper cradle 10.

The lower cradle 8 and the upper cradle 10 comprise respective lower lateral wings 56 and upper lateral wings 58 engaging, in use, the rails R of the saddle, in order to clamp them tightly.

In use, as the rails R of the saddle are engaged between the lower and upper lateral wings 56,58, and the front screw and rear screw 38,42 are not tightened yet, the desired angle of the rails R with respect to the quill head 4 can be easily manually adjusted.

When the desired angle is achieved, the front screw 38 and rear screw 42 can be tightly screwed inside the respective front nut 40 and rear nut 44, until the friction between the components blocks the lower cradle 8 onto the quill head 4, and the rails R between the lower and upper lateral wings 56,58.

In any position achieved, the first load F1 in the front screw 38 is always exactly the same as the second load F2 in the rear screw 44.

The screws 38,42 has therefore less of a tendency to unscrew during long term use when compared with the solutions of the prior art.

Regardless of the angle adjustment, the screws 38,42 don't need to be regularly tightened as it happens for the prior art solutions.

Another advantage of the solution according to the present invention is that a single proper torque can be applied to both fasteners 12,14 regardless of the rails R angle.

The present invention has been described according to preferred embodiments, but equivalent variants can be devised without departing from the scope of protection offered by the following claims.

The invention claimed is:

1. A seat post, of the kind suitable to clamp the rails (R) of the saddle of a bicycle, or the like, in the desired position, comprising
  a quill having a quill head, said quill head comprising a top surface,
  a lower cradle and an upper cradle reciprocally coupled in order to clamp saddle rails (R), said lower cradle being rotationally associated to said top surface around a rotational axis (X),
  a front fastener and a rear fastener connecting said upper cradle to said quill head, and
  a front pivot and a rear pivot in which said front fastener and said rear fastener are respectively engaged in order to adjust the saddle rails (R) angle with respect to said quill head,
  said quill head comprising a front seat and a rear seat in which said front pivot and said rear pivot are respectively rotationally engaged, the front and rear axes (Y,Z) about which said front and rear pivot are respectively rotatable being displaced substantially at a same distance (D) from said rotational axis (X), regardless of rails (R) angle adjustment,
  wherein said top surface has a convex shape, said lower cradle comprising a lower concave seat suitable to engage said top surface.

2. The seat post according to claim 1, wherein said quill head comprises a front recess and a rear recess respectively intercepting said front seat and rear seat, in order to allow the positioning of said front fastener and rear fastener.

3. The seat post according to claim 1, wherein said front fastener comprises a front screw having a front screw head resting on said upper cradle, and a front screw thread engaged in a front nut foreseen in said front pivot.

4. The seat post according to claim 1, wherein said rear fastener comprises a rear screw passing through said rear pivot and having a rear screw head resting on the external surface of said rear pivot, and a rear screw thread engaged in a rear nut foreseen in said upper cradle.

5. The seat post according to claim 4, wherein said lower cradle comprises a rear opening through which said rear nut is passing.

6. The seat post according to claim 3, wherein said front fastener comprises an adjustment ring fastened to the shank of said front screw.

7. The seat post according to claim 6, wherein said lower cradle comprises a front opening through which said adjustment ring is passing.

8. The seat post according to claim 1, wherein said upper cradle comprises a central opening or recess housing the convex top of said lower cradle.

9. The seat post according to claim 1, wherein said front seat and/or said rear seat are passing through said quill head.

10. The seat post according to claim 1, wherein said quill head comprises a central passing channel communicating with said front seat and/or said rear seat.

11. The seat post according to claim 1, wherein said quill head has a rearward elongated shape.

12. The seat post according to claim 11, wherein said quill head comprises a front limit and a rear limit for the rotation of said lower cradle around said rotational axis (X).

13. The seat post according to claim 1, wherein said top surface comprises a cylindrical portion which is coaxial to said rotational axis (X), having radius which is equal to said distance (D).

\* \* \* \* \*